United States Patent [19]

Greenewald, Jr.

[11] 4,028,122

[45] June 7, 1977

[54] POROUS REFRACTORY SHAPES

[76] Inventor: Herbert Greenewald, Jr., 4296 Braunton Road, Columbus, Ohio 43220

[22] Filed: Aug. 5, 1975

[21] Appl. No.: 602,122

Related U.S. Application Data

[63] Continuation-in-part of Ser. Nos. 370,624, June 18, 1973, abandoned, and Ser. No. 172,550, Aug. 17, 1971, abandoned.

[52] U.S. Cl. .............................. 106/40 R; 106/44; 106/57; 106/65; 106/66; 106/69
[51] Int. Cl.² ........................................ C04B 35/52
[58] Field of Search ........................... 106/65, 40 R

[56] References Cited

UNITED STATES PATENTS

| 2,883,297 | 4/1959 | Jeitner | 106/65 |
| 3,082,104 | 3/1963 | Belz | 106/65 |
| 3,086,876 | 4/1963 | Griggs et al. | 106/65 |
| 3,151,994 | 10/1964 | Adlassnig | 106/65 |
| 3,219,466 | 11/1965 | Isherwood | 106/65 |
| 3,220,860 | 11/1965 | Robiette et al. | 106/65 |
| 3,220,862 | 11/1965 | Miller | 106/65 |
| 3,634,112 | 1/1972 | Yavorsky et al. | 106/65 |

Primary Examiner—J. Poer
Attorney, Agent, or Firm—Daniel H. Dunbar

[57] ABSTRACT

Porous refractory shapes having sufficient strength for use as thermal insulation in metal melting furnaces at insulation service temperatures of 3,400° to 3,900° F are formed in place by bonding refractory particles of alumina, for instance, with aluminum hydroxide generated by the reaction of aluminum with water in the presence of a corrosion accelerator, and either with or without a reaction control agent satisfactory for eliminating or significantly suppressing the evolution of hydrogen, nitrogen dioxide, hydrogen chloride, or the like from the reacting mass or for reducing the rate of reaction corrosion.

9 Claims, No Drawings

POROUS REFRACTORY SHAPES

CROSS-REFERENCES

This is a continuation-in-part of my previous application Ser. No. 370,624, filed June 18, 1973, and also of my previous abandoned application Ser. No. 172,550, filed Aug. 17, 1971 both now abandoned.

SUMMARY OF THE INVENTION

Finely divided refractory particles taken from the group consisting essentially of alumina particles, zircon particles, silica particles, chromium oxide particles, and silicon carbide particles are combined with bond-forming ingredients consisting of aluminum metal powder and water which essentially form aluminum hydroxide bonds between the refractory particles by corrosion reaction at temperatures not exceeding approximately 200°–250° F. The weight of aluminum metal powder must be in the approximate range of from 5 to 20% the weight of the refractory particles and the weight of the water in the approximate range of from 10 to 40% the weight of the refractory particles. The corrosion accelerator ingredient is from the group consisting of aluminum nitrate, aluminum chloride, nitric acid, hydrochloric acid, sulfuric acid, ammonium oxalate, oxalic acid, chromic acid, chromium nitrate, hydroxylacetic acid, gluconic acid, and citric acid, and is included in an amount by weight of approximately from 5 to 35% the weight of the refractory particles and from 67 to as much as 700% the weight of the aluminum metal powder. If used, the reaction control agent may be from the group essentially comprised of glucose, aluminum chloride (excepting when the corrosion accelerator is aluminum chloride), chromic acid (excepting when the corrosion accelerator is chromic acid), ethyl alcohol, methyl alcohol, fructose, and dextrose generally in a weight amount of from 35 to 300% the weight of the aluminum metal powder. The ingredients for forming the porous refractory shapes are properly thoroughly mixed in a vessel, brought to a casting temperature with the addition of reaction-initiating heat (if necessary), poured typically into metal or consumable material shape forms while at a temperature generally in the range of 65°–200° F, and allowed to react with the consequent formation of aluminum hydroxide bonds between the refractory particles, such being the corrosion products of the combined aluminum and water ingredients. After all water vapors are driven from the porous integral shape by the corrosion reaction process (e.g. to 11–15% residual water), the shape is further heated by the external application of heat to a temperature of 400° to 500° F or greater to drive off substantially all except perhaps 0.1% of the contained water. The remaining water is afterwards completely removed on firing the shape to temperatures in the range of approximately 800° to 1,000° F. Bulk densities of the resulting shape, which shape is ideal for use in metal alloy melting furnaces for thermal and electrical insulation at service temperatures of from 3,400° to 3,900° F, are typically in the range of 50 to 100 pounds per cubic foot.

DETAILED DESCRIPTION

The following examples 1 through 15 refractory shape composition formulations have been used in the practice of the instant invention. In each case the quantitative values are on a 100 parts total weight basis. Pertinent comments regarding preferred processing and resulting uses for the product follow the illustrative formulations.

Example 1

| Ingredients | Parts by Weight |
| --- | --- |
| Alumina, −325 mesh tabular flour | 73.1 |
| Aluminum, 120 mesh atomized metal powder | 3.7 |
| Active nitrate ion compound, aluminum nitrate crystal | 11.6 |
| Water | 11.6 |
| Total | 100.0 |

Example 2

| Ingredients | Parts by Weight |
| --- | --- |
| Zirconium silicate, −200 mesh flour | 73.1 |
| Aluminum, 120 mesh atomized metal powder | 3.7 |
| Active nitrate ion compound, aluminum nitrate crystal | 11.6 |
| Water | 11.6 |
| Total | 100.0 |

Example 3

| Ingredients | Parts by Weight |
| --- | --- |
| Silica, −200 mesh flour | 57.2 |
| Aluminum, 120 mesh atomized metal powder | 2.8 |
| Active nitrate ion compound, aluminum nitrate crystal | 20.0 |
| Water | 20.0 |
| total | 100.0 |

Example 4

| Ingredients | Parts by Weight |
| --- | --- |
| Alumina, −325 mesh tabular flour | 67.5 |
| Aluminum, 120 mesh atomized metal powder | 6.8 |
| Organic reducing agent, glucose | 6.8 |
| Active nitrate ion compound, aqueous solution of nitric acid (41% HNO$_3$ in water) | 18.9 |
| Total | 100.0 |

Example 5

| Ingredients | Parts by Weight |
| --- | --- |
| Alumina, −325 mesh tabular flour | 73.5 |
| Aluminum, 120 mesh atomized metal powder | 3.7 |
| Organic reducing agent, glucose | 8.8 |
| Active nitrate ion compound, aluminum nitrate crystal | 7.0 |
| Water | 7.0 |
| Total | 100.0 |

Example 6

| Ingredients | Parts by Weight |
| --- | --- |
| Alumina, tabular flour | 73.6 |
| Aluminum, 120 mesh atomized metal powder | 3.7 |
| Organic reducing agent, glucose | 6.5 |
| Active nitrate ion compound, aluminum nitrate crystal | 8.1 |
| Water | 8.1 |
| Total | 100.0 |

Example 7

| Ingredients | Parts by Weight |
| --- | --- |
| Alumina, −325 mesh tabular flour | 66.2 |
| Aluminum, 120 mesh atomized metal powder | 6.6 |
| Organic reducing agent, glucose | 13.3 |
| Active nitrate ion compound, aqueous solution of nitric acid (41% HNO$_3$ in water) | 13.9 |

Example 7-continued

| Ingredients | Parts by Weight |
| --- | --- |
| Total | 100.0 |

Example 8

| Ingredients | Parts by Weight |
| --- | --- |
| Alumina, −325 mesh fused flour | 68.5 |
| Aluminum, 120 mesh atomized metal powder | 3.4 |
| Aluminum chloride | 6.4 |
| Aluminum nitrate crystal | 6.1 |
| Water | 15.4 |
| Total | 100.0 |

Example 9

| Ingredients | Parts by Weight |
| --- | --- |
| Alumina, −325 mesh fused flour | 69.0 |
| Aluminum, 120 mesh atomized metal powder | 3.4 |
| Aluminum chloride | 8.8 |
| Chromic acid ($CrO_3$) | 2.8 |
| Water | 16.0 |
| Total | 100.0 |

Example 10

| Ingredients | Parts by Weight |
| --- | --- |
| Alumina −325 mesh calcined flour | 65.0 |
| Aluminum, 120 mesh metal powder | 4.5 |
| Chromic acid crystal | 5.6 |
| Aluminum chloride | 5.0 |
| Water | 19.9 |
| Total | 100.0 |

Example 11

| Ingredients | Parts by Weight |
| --- | --- |
| Alumina, −325 mesh tabular flour | 46.0 |
| Alumina, in C-33 hydrated alumina flour | 14.3 |
| Aluminum, 120 mesh metal powder | 4.1 |
| Chromic acid crystal | 5.2 |
| Aluminum chloride | 4.7 |
| Water (including in hydrated alumina flour) | 25.7 |
| Total | 100.0 |

Example 12

| Ingredients | Parts by Weight |
| --- | --- |
| Alumina, −325 mesh fused flour | 60.8 |
| Aluminum, 120 mesh metal powder | 12.2 |
| Chromic acid crystal | 1.2 |
| Aluminum nitrate | 7.0 |
| Water | 18.8 |
| Total | 100.0 |

Example 13

| Ingredients | Parts by Weight |
| --- | --- |
| Alumina, ⅛" and finer grog | 68.0 |
| Aluminum, 120 mesh metal powder | 3.9 |
| Nitric acid (concentrated) | 15.7 |
| Chromic acid crystal | 1.2 |
| Water | 11.2 |
| Total | 100.0 |

Example 14

| Ingredients | Parts by Weight |
| --- | --- |
| Alumina, ⅛" and finer grog | 67.8 |
| Aluminum, 120 mesh metal powder | 3.9 |
| Nitric acid (concentrated) | 11.7 |
| Chromic acid crystal | 0.9 |
| Glucose | 7.2 |
| Water | 8.5 |

Example 14-continued

| Ingredients | Parts by Weight |
| --- | --- |
| Total | 100.0 |

Example 15

| Ingredients | Parts by Weight |
| --- | --- |
| Alumina, ⅛" and finer grog | 67.8 |
| Aluminum, 120 mesh metal powder | 3.8 |
| Nitric acid (concentrated) | 10.8 |
| Chromic acid crystal | 0.9 |
| Glucose | 8.9 |
| Water | 7.8 |
| Total | 100.0 |

All of the above example formulations are within the limits heretofore specified as to proportional aluminum metal, water, corrosion accelerator, and reaction control agent (if used) ingredient weights relative to weights of refractory particles. Basically, the refractory particles may be of any size from 4 mesh to flour and should be chemically inert to the aluminum metal, water, and selected corrosion accelerator and reaction control agent ingredients at temperatures near room temperature. Generally magnesia and calcia refractories are not satisfactory for use in the practice of this invention for this reason.

The refractory particles normally represent from 50 to 75% of the total unreacted shape composition. Alumina refractory has the highest service temperature in the practice of this invention and if selected may be used in the form of pure fused alumina, calcined alumina, tabular alumina, or alumina hydrate. Physical form and particle size determine the exact proportion preferred and the obtained final shape properties. Fused and tabular alumina provide greatest end strengths, calcined the next greatest, and hydrated alumina the least. Hydrated alumina also produces the lowest obtained bulk densities.

The aluminum metal powder ingredient must be present in a minimum amount sufficient to raise the temperature of the cast reacting mass to above 212° F to drive all contained free moisture from the shape during curing and prior to firing to remove combined water. The maximum amount of aluminum metal powder selected must be such all aluminum included in the composition is reacted to form aluminum hydroxide particle bonds prior to firing at elevated temperatures to remove combined water.

Materials satisfactory for comprising the corrosion accelerators have the following necessary characteristics:

1. The accelerator must be substantially soluble in water at room temperatures and to 212° F;
2. The accelerator must catalize a rapid corrosion of the aluminum metal powder at temperatures up to 212° F and as such generally requires an aqueous solution pH of less than approximately 5 or greater than approximately 8;
3. The accelerator must not contain any metal ions other than aluminum or chromium ions;
4. The corrosion accelerator must not result in the formation of aluminum compounds that do not break down to aluminum hydroxide or aluminum oxide at temperatures of corrosion reaction or very low firing temperatures. Generally, accelerator ingredients having included phosphate or fluoride ions are unsatisfactory in the practice of this invention for this reason; and 5. The corrosion accelerator may be formed by the combination of two or more common chemicals to form a chemical whose precise identity is not presently known but whose resulting properties are clearly desirable. Examples of such combinations are:
   A. Aluminum nitrate and aluminum chloride—slows corrosion reaction and suppresses emission of hydrogen chloride and nitrogen dioxide;
   B. Aluminum nitrate and glucose—slows reaction in comparison to use of aluminum nitrate alone and suppresses emission of nitrogen dioxide;
   C. Aluminum nitrate and chromic acid—higher strength in formed shape and slows reaction in comparison to use of aluminum nitrate corrosion accelerator alone;
   D. Aluminum chloride and chromic acid—suppresses emission of hydrogen chloride;
   E. Nitric acid and glucose—minimizes formation of nitrogen dioxide and slows the corrosion reaction in comparison to use of nitric acid alone;
   F. Nitric acid and chromic acid—slows the reaction over nitric acid alone and produces higher end strength; and
   G. Sulfuric acid and chromic acid—results in higher end strength.

The basic steps required in the practice of this invention are:

1. Each of the accurately measured ingredients is combined in the following sequence in a vessel and utilizing continuous mixing but only after thorough pre-mixing at each stage:
   A. Water;
   B. Corrosion accelerator and, if used, reaction control agent;
   C. Refractory flour particles;
   D. Refractory granular particles; and
   E. Aluminum metal powder.

Depending on ambient temperature it may be necessary to provide some of the water in the form of ice to delay the onset of accelerated corrosion.

2. Heat if necessary is applied to the mixing vessel next while continuing mixing and until a threshold casting temperature just below the onset of initiation of accelerated corrosion is reached. Depending on the specific formulation used, and based largely on consideration of being slightly in advance of the mixture's time-temperature curve point of accelerated slope change, the threshold temperature selected will generally be somewhere in the range of 65° to 200° F and is the temperature at which no further heat is required to effect shape solidification (curing) and preliminary drying in situ.

3. The heated mixture is rapidly poured or cast into a mold for reaction to form the refractory shape. The mold or form may be made of metal or sometimes made of an oxidation-consumable material such as oiled cardboard.

4. The cast composition is next allowed to react at ambient pressure and without the further addition of external heat until it attains a temperature above 212° F at which the contained free moisture is driven off. Material temperature to as high as approximately 250° F have been measured in connection with this curing step. Evolved hydrogen, steam, or other gaseous products of the corrosion reaction, under the obtained formulation viscosity characteristics are at least in part temporarily retained in the shape and assist in the formation of pores within the mixture during the accelerated corrosion curing reaction.

5. The form is afterwards stripped from the cured shape and the shape heated, without inherent damage by thermal shock or by elevated moisture pressures, by full furnace heat to drive off all residual combined water (from 10 to 15% by weight) by the time the refractory shape attains a temperature of approximately 500° F. Further heating of the cured shape to temperatures of approximately 800° F maximum appears to be effective to drive off all residual combined water from the composition which generally appears to be very much less than 0.1% of the weight of the cured shape.

Several comments are in order with respect to certain of the Example 1 through 15 formulations.

The compositions detailed in connection with Examples 1 through 3 have been successfully used to form a foamlike insulating refractory but with the evolution of substantial amounts of nitrogen dioxide gas. During the exothermic reaction (completed at a maximum temperature equal to the boiling point of the water solutions) and foaming, such compositions exhibited an increase in volume of from 2:1 to 3:1 in reaching the solid state. The higher the proportion of water to base ceramics, the higher the increase in volume.

The compositions specified in connection with Examples 4 and 5 illustrate the degree of exothermic reaction acceleration which can be obtained with nitric acid as the active nitrate ion compound in comparison with aluminum nitrate crystal. The Example 4 composition reacted exothermically within approximately 20 minutes at room temperature to form an insulating alumina foam of good strength. The Example 5 composition, in comparison, required six hours for the starting of the exothermic reaction at room temperature. In each case the included glucose (corn syrup) organic reaction control agent was effective to significantly reduce the degree of evolved nitrogen dioxide gas (Example 4) or to completely eliminate the $NO_2$ (Example 5). The Example 6 composition represents a good balance of obtainable composition properties; the Example 7 composition had an intermediate time to reaction suppressive effect of the optional added organic reducing agent.

Example 8 composition was mixed in 150 pound batches to form an insulating lining in a metal melting furnace where the total insulating lining of this composition weighed over 2000 pounds. Mixing was done in an open 55-gallon steel drum using a propellor type mixer. The liquid ingredients were charged first to the drum, mixed, the alumina was charged next and mixed and finally the aluminum metal powder was added and mixed. The aluminum chloride and aluminum nitrate were added to the water in the drum prior to the addition of the alumina and dissolved. The mixing was completed and the material promptly poured into a warm metal shell of the furnace with a cardboard form forming the inner boundary of the insulating lining. Each mix took about 40 minutes to complete its foaming reaction after addition of the aluminum powder to the slurry in the mixer. The furnace with this lining has been in service for a number of months. No objectionable fume or hydrogen evolution was noted during the curing and reaction of the foam.

Example 9 was mixed in the same manner as Example 8 with the aluminum chloride and chromic acid being mixed as solutions prior to the addition of the alumina or aluminum metal powder. This example also foamed and reacted in about 40 minutes in a warm steel shell. Again no odor or hydrogen was detected.

The Example 10 formulation in a 338 pound batch was mixed and heated to a temperature of 142° F at time of pouring. The bulk density of the composition after curing was 66.6 pounds per cubic foot; after firing to 1100° F the bulk density was 60.9 pounds per cubic foot. Mixing was completed in 12 minutes, heating 52 minutes later. In the Example 10 formulation as well as all other examples, all corrosion accelerators are preferably separately or individually dissolved in water prior to combining and prior to the addition of refractory ingredients.

The Example 11 formulation was prepared in accordance with the prescribed steps and generally similarly to the processing of Example 10. However, the cured and final bulk densities of the formed shape were 59.8 and 51.1 pounds per cubic foot, respectively.

The Example 12 composition was cast after heating to a temperature of 154° F and was also heated in a metal form to a temperature of 180° F. Noticeable accelerated corrosion had commenced by the time the mixture reached a measured temperture of 224° F. Bulk densities of the rigid shape as cured and as fired (2,300° F) were 103.4 and 102.1 pounds per cubic foot, respectively.

The composition of Example 13 was poured at 90° F following mixing at room temperature first (10 minutes) and then heating externally (11 minutes). Bulk densities cured and fired (1,500° F) were 80.7 and 71.4 pounds per cubic foot, respectively.

A 140 pound batch of Example 14 composition was mixed for 10 minutes and then heated to a temperature of 89° F over a period of 8 additional minutes. The mix was poured at a temperature of 95° F and reached a temperature of 240° F within 22 minutes without further heating. The cured and as-fired (1,500° F) bulk densities of the shape were 61.3 and 54.1 pounds per cubic foot, respectively.

A 280 pound batch of Example 15 material was thoroughly mixed in 21 minutes and then was cast at 86° F 2 minutes later without external heating being required. The mix rose to a maximum level in the form utilized and held without falling back. The maximum temperature measured in the curing shape was 248° F, 42 minutes after pouring. Cured and fired bulk densities were 61.1 and 54.4 pounds per cubic foot, respectively.

Excesses of aluminum metal powder in the composition appear to cause severe fracturing of the cured shape upon firing to elevated temperatures. Excess corrosion accelerator ingredient appears to produce a like effect.

I claim:

1. A process of manufacturing a rigid porous refractory shape comprising the steps of: (a) mixing refractory particles selected from the group consisting essentially of alumina particles, zircon particles, silica particles, chromium oxide particles, and silicon carbide particles with bond-forming ingredients consisting of aluminum metal powder, water, and a corrosion accelerator in solution with said water to a fluid consistency; (b) casting said fluid mixture into a form at least in part defining said shape; and (c) reacting said bond-forming ingredients to form aluminum hydroxide bonds between said refractory particles, said aluminum metal powder ingredient weighing substantially from 5 to 20% the weight of said refractory particles, said water ingredient weighing substantially from 10 to 40% the weight of said refractory particles, and said corrosion accelerator being from the group consisting essentially of aluminum nitrate, aluminum chloride, nitric acid, hydrochloric acid, sulfuric acid, ammonium oxalate, oxalic acid, chromic acid, chromium nitrate, hydroxylacetic acid, gluconic acid, and citric acid and weighing substantially from 5 to 35% the weight of said refractory particles and substantially from 67 to 700% the weight of said aluminum metal powder.

2. The process defined by claim 1 wherein said refractory particles and bond-forming ingredients are further mixed with a reaction control agent that chemically reacts with a gaseous reaction product of said aluminum metal powder, water and corrosion accelerator when said refractory particles are bonded to form said rigid refractory shape.

3. The process defined by claim 2 wherein said reaction control agent is from the group consisting essentially of glucose, aluminum chloride excepting when said corrosion accelerator is aluminum chloride, chromic acid excepting when said corrosion accelerator is chromic acid, ethyl alcohol, methyl alcohol, fructose, and dextrose and wherein said reducing agent weighs substantially from 35 to 300% the weight of said aluminum metal powder.

4. The chemical reaction product of a mixture consisting exxentially of refractory particles in size between flour and 4 mesh and from the group consisting of alumina particles, zircon particles, silica particles, chromic oxide ($Cr_2O_3$) particles, and silicon carbide particles, aluminum metal powder weighing substantially from 5 to 20% the weight of said refractory particles, water weighing substantially from 10 to 40% the weight of said refractory particles and corrosion accelerator selected from the group consisting essentially of aluminum nitrate, aluminum chloride, nitric acid, hydrochloric acid, sulfuric acid, ammonium oxalate, oxalic acid, chromic acid, chromium nitrate, hydroxylacetic acid, gluconic acid, and citric acid and weighing substantially from 5 to 35% the weight of waid refractory particles and substantially from 67 to as much as 700% the weight of said aluminum metal powder, said chemical reaction product being porous and having a bulk density less than approximately 100 pounds per cubic foot.

5. The product defined by claim 4 wherein said refractory particles, aluminum metal powder, water, and corrosion accelerator mixture further consists of a reaction control agent that chemically combines with a gaseous chemical reaction product of said aluminum metal powder, water and corrosion accelerator.

6. The product defined by claim 5 wherein said reaction control agent is from the group consisting essentially of glucose, aluminum chloride excepting when said corrosion accelerator is aluminum chloride, chromic acid excepting when said corrosion accelerator is chromic acid, ethyl alcohol, methyl alcohol, fructose, and dextrose and wherein said reducing agent weighs substantially from 35 to 300% the weight of said aluminum metal powder.

7. The process defined by claim 1 wherein said fluid mixture is heated by the external application of heat to a temperature in the approximate range of 60° to 200° F prior to casting.

8. The process defined by claim 1 wherein said refractory particles are bonded together without the application of external pressure other than atmospheric pressure.

9. The process defined by claim 1 wherein said corrosion accelerator and water ingredients have a pH less than approximately 5 or greater than approximately 8.

* * * * *